United States Patent
Nguyen et al.

(10) Patent No.: US 12,316,268 B2
(45) Date of Patent: May 27, 2025

(54) ROOFING SYSTEMS WITH WATER INGRESS PROTECTION

(71) Applicant: GAF Energy LLC, Parsippany, NJ (US)

(72) Inventors: Thierry Nguyen, San Francisco, CA (US); Ray Lu, Parsippany, NJ (US); Rory Runser, Palo Alto, CA (US)

(73) Assignee: GAF Energy LLC, Parsippany, NJ (US)

( * ) Notice: Subject to any disclaimer, the term of this patent is extended or adjusted under 35 U.S.C. 154(b) by 0 days.

(21) Appl. No.: 18/927,132

(22) Filed: Oct. 25, 2024

(65) Prior Publication Data

US 2025/0141397 A1    May 1, 2025

Related U.S. Application Data (60) Provisional application No. 63/593,361, filed on Oct. 26, 2023.

(51) Int. Cl.
*H02S 20/25* (2014.01)
*E04D 1/30* (2006.01)

(52) U.S. Cl.
CPC ............. *H02S 20/25* (2014.12); *E04D 1/30* (2013.01); *E04D 2001/308* (2013.01)

(58) Field of Classification Search
CPC ...... H02S 20/25; E04D 1/30; E04D 2001/308
See application file for complete search history.

(56) References Cited

U.S. PATENT DOCUMENTS

| | | | |
|---|---|---|---|
| 1,981,467 A | 11/1934 | Radtke | |
| 3,156,497 A | 11/1964 | Lessard | |
| 3,581,779 A | 6/1971 | Gilbert, Jr. | |
| 4,258,948 A | 3/1981 | Hoffmann | |
| 4,349,220 A | 9/1982 | Carroll et al. | |
| 4,499,702 A | 2/1985 | Turner | |
| 4,636,577 A | 1/1987 | Peterpaul | |
| 5,167,579 A | 12/1992 | Rotter | |
| 5,304,095 A * | 4/1994 | Morris | E04D 13/174 454/365 |
| 5,437,735 A | 8/1995 | Younan et al. | |
| 5,590,495 A | 1/1997 | Bressler et al. | |
| 5,642,596 A | 7/1997 | Waddington | |

(Continued)

FOREIGN PATENT DOCUMENTS

| | | |
|---|---|---|
| CA | 2829440 A | 5/2019 |
| CH | 700095 A2 | 6/2010 |

(Continued)

OTHER PUBLICATIONS

Sunflare, Procducts: "Sunflare Develops Prototype For New Residential Solar Shingles"; 2019 <<sunflaresolar.com/news/sunflare-develops-prototype-for-new-residential-solar-shingles>> retrieved Feb. 2, 2021.

(Continued)

*Primary Examiner* — Babajide A Demuren
(74) *Attorney, Agent, or Firm* — GREENBERG TRAURIG, LLP (57) ABSTRACT

A roofing system includes a roof deck and at least one photovoltaic module installed on the roof deck. The first photovoltaic module includes at least one solar cell and a sealant. At least one fastener penetrates the sealant and the roof deck.

18 Claims, 6 Drawing Sheets

(56) References Cited

U.S. PATENT DOCUMENTS

| | | |
|---|---|---|
| 6,008,450 A | 12/1999 | Ohtsuka et al. |
| 6,033,270 A | 3/2000 | Stuart |
| 6,046,399 A | 4/2000 | Kapner |
| 6,201,180 B1 | 3/2001 | Meyer et al. |
| 6,220,329 B1 | 4/2001 | King et al. |
| 6,308,482 B1 | 10/2001 | Strait |
| 6,320,114 B1 | 11/2001 | Kuechler |
| 6,320,115 B1 | 11/2001 | Kataoka et al. |
| 6,336,304 B1 | 1/2002 | Mimura et al. |
| 6,341,454 B1 | 1/2002 | Koleoglou |
| 6,407,329 B1 | 6/2002 | Iino et al. |
| 6,576,830 B2 | 6/2003 | Nagao et al. |
| 6,928,781 B2 | 8/2005 | Desbois et al. |
| 6,972,367 B2 | 12/2005 | Federspiel et al. |
| 7,138,578 B2 | 11/2006 | Komamine |
| 7,155,870 B2 | 1/2007 | Almy |
| 7,178,295 B2 | 2/2007 | Dinwoodie |
| 7,487,771 B1 | 2/2009 | Eiffert et al. |
| 7,587,864 B2 | 9/2009 | McCaskill et al. |
| 7,678,990 B2 | 3/2010 | McCaskill et al. |
| 7,678,991 B2 | 3/2010 | McCaskill et al. |
| 7,748,191 B2 | 7/2010 | Podirsky |
| 7,819,114 B2 | 10/2010 | Augenbraun et al. |
| 7,824,191 B1 | 11/2010 | Podirsky |
| 7,832,176 B2 | 11/2010 | McCaskill et al. |
| 8,118,109 B1 | 2/2012 | Hacker |
| 8,168,880 B2 | 5/2012 | Jacobs et al. |
| 8,173,889 B2 | 5/2012 | Kalkanoglu et al. |
| 8,210,570 B1 | 7/2012 | Railkar et al. |
| 8,276,329 B2 | 10/2012 | Lenox |
| 8,312,693 B2 | 11/2012 | Cappelli |
| 8,319,093 B2 | 11/2012 | Kalkanoglu et al. |
| 8,333,040 B2 | 12/2012 | Shiao et al. |
| 8,371,076 B2 | 2/2013 | Jones et al. |
| 8,375,653 B2 | 2/2013 | Shiao et al. |
| 8,404,967 B2 | 3/2013 | Kalkanoglu et al. |
| 8,410,349 B2 | 4/2013 | Kalkanoglu et al. |
| 8,418,415 B2 | 4/2013 | Shiao et al. |
| 8,438,796 B2 | 5/2013 | Shiao et al. |
| 8,468,754 B2 | 6/2013 | Railkar et al. |
| 8,468,757 B2 | 6/2013 | Krause et al. |
| 8,505,249 B2 | 8/2013 | Geary |
| 8,512,866 B2 | 8/2013 | Taylor |
| 8,513,517 B2 | 8/2013 | Kalkanoglu et al. |
| 8,586,856 B2 | 11/2013 | Kalkanoglu et al. |
| 8,601,754 B2 | 12/2013 | Jenkins et al. |
| 8,629,578 B2 | 1/2014 | Kurs et al. |
| 8,646,228 B2 | 2/2014 | Jenkins |
| 8,656,657 B2 | 2/2014 | Livsey et al. |
| 8,671,630 B2 | 3/2014 | Lena et al. |
| 8,677,702 B2 | 3/2014 | Jenkins |
| 8,695,289 B2 | 4/2014 | Koch et al. |
| 8,713,858 B1 | 5/2014 | Xie |
| 8,713,860 B2 | 5/2014 | Railkar et al. |
| 8,733,038 B2 | 5/2014 | Kalkanoglu et al. |
| 8,776,455 B2 | 7/2014 | Azoulay |
| 8,789,321 B2 | 7/2014 | Ishida |
| 8,793,940 B2 | 8/2014 | Kalkanoglu et al. |
| 8,793,941 B2 | 8/2014 | Bosler et al. |
| 8,826,607 B2 | 9/2014 | Shiao et al. |
| 8,835,751 B2 | 9/2014 | Kalkanoglu et al. |
| 8,863,451 B2 | 10/2014 | Jenkins et al. |
| 8,898,970 B2 | 12/2014 | Jenkins et al. |
| 8,925,262 B2 | 1/2015 | Railkar et al. |
| 8,943,766 B2 | 2/2015 | Gombarick et al. |
| 8,946,544 B2 | 2/2015 | Jabos et al. |
| 8,950,128 B2 | 2/2015 | Kalkanoglu et al. |
| 8,959,848 B2 | 2/2015 | Jenkins et al. |
| 8,966,838 B2 | 3/2015 | Jenkins |
| 8,966,850 B2 | 3/2015 | Jenkins et al. |
| 8,994,224 B2 | 3/2015 | Mehta et al. |
| 9,032,672 B2 | 5/2015 | Livsey et al. |
| 9,121,178 B2 | 9/2015 | Belt et al. |
| 9,153,950 B2 | 10/2015 | Yamanaka et al. |
| 9,166,087 B2 | 10/2015 | Chihlas et al. |
| 9,169,646 B2 | 10/2015 | Rodrigues et al. |
| 9,170,034 B2 | 10/2015 | Bosler et al. |
| 9,178,465 B2 | 11/2015 | Shiao et al. |
| 9,202,955 B2 | 12/2015 | Livsey et al. |
| 9,212,832 B2 | 12/2015 | Jenkins |
| 9,217,584 B2 | 12/2015 | Kalkanoglu et al. |
| 9,270,221 B2 | 2/2016 | Zhao |
| 9,273,885 B2 | 3/2016 | Rodrigues et al. |
| 9,276,141 B2 | 3/2016 | Kalkanoglu et al. |
| 9,331,224 B2 | 5/2016 | Koch et al. |
| 9,356,174 B2 | 5/2016 | Duarte et al. |
| 9,359,014 B1 | 6/2016 | Yang et al. |
| 9,412,890 B1 | 8/2016 | Meyers |
| 9,528,270 B2 | 12/2016 | Jenkins et al. |
| 9,605,432 B1 | 3/2017 | Robbins |
| 9,711,672 B2 | 7/2017 | Wang |
| 9,755,573 B2 | 9/2017 | Livsey et al. |
| 9,786,802 B2 | 10/2017 | Shiao et al. |
| 9,831,818 B2 | 11/2017 | West |
| 9,912,284 B2 | 3/2018 | Svec |
| 9,923,515 B2 | 3/2018 | Rodrigues et al. |
| 9,938,729 B2 | 4/2018 | Coon |
| 9,991,412 B2 | 6/2018 | Gonzalez et al. |
| 9,998,067 B2 | 6/2018 | Kalkanoglu et al. |
| 10,027,273 B2 | 7/2018 | West et al. |
| 10,115,850 B2 | 10/2018 | Rodrigues et al. |
| 10,128,660 B1 | 11/2018 | Apte et al. |
| 10,156,075 B1 | 12/2018 | McDonough |
| 10,187,005 B2 | 1/2019 | Rodrigues et al. |
| 10,256,765 B2 | 4/2019 | Rodrigues et al. |
| 10,284,136 B1 | 5/2019 | Mayfield et al. |
| 10,454,408 B2 | 10/2019 | Livsey et al. |
| 10,530,292 B1 | 1/2020 | Cropper et al. |
| 10,560,048 B2 | 2/2020 | Fisher et al. |
| 10,563,406 B2 | 2/2020 | Kalkanoglu et al. |
| D879,031 S | 3/2020 | Lance et al. |
| 10,579,028 B1 | 3/2020 | Jacob |
| 10,784,813 B2 | 9/2020 | Kalkanoglu et al. |
| D904,289 S | 12/2020 | Lance et al. |
| 11,012,026 B2 | 5/2021 | Kalkanoglu et al. |
| 11,085,187 B2 | 8/2021 | Grubka et al. |
| 11,177,639 B1 | 11/2021 | Nguyen et al. |
| 11,217,715 B2 | 1/2022 | Sharenko et al. |
| 11,251,744 B1 | 2/2022 | Bunea et al. |
| 11,258,399 B2 | 2/2022 | Kalkanoglu et al. |
| 11,283,394 B2 | 3/2022 | Perkins et al. |
| 11,309,828 B2 | 4/2022 | Sirski et al. |
| 11,394,344 B2 | 7/2022 | Perkins et al. |
| 11,424,379 B2 | 8/2022 | Sharenko et al. |
| 11,431,280 B2 | 8/2022 | Liu et al. |
| 11,431,281 B2 | 8/2022 | Perkins et al. |
| 11,444,569 B2 | 9/2022 | Clemente et al. |
| 11,454,027 B2 | 9/2022 | Kuiper et al. |
| 11,459,757 B2 | 10/2022 | Nguyen et al. |
| 11,486,144 B2 | 11/2022 | Bunea et al. |
| 11,489,482 B2 | 11/2022 | Peterson et al. |
| 11,496,088 B2 | 11/2022 | Sirski et al. |
| 11,508,861 B1 | 11/2022 | Perkins et al. |
| 11,512,480 B1 | 11/2022 | Achor et al. |
| 11,527,665 B2 | 12/2022 | Boitnott |
| 11,545,927 B2 | 1/2023 | Abra et al. |
| 11,545,928 B2 | 1/2023 | Perkins et al. |
| 11,658,470 B2 | 5/2023 | Nguyen et al. |
| 11,661,745 B2 | 5/2023 | Bunea et al. |
| 11,689,149 B2 | 6/2023 | Clemente et al. |
| 11,705,531 B2 | 7/2023 | Sharenko et al. |
| 11,728,759 B2 | 8/2023 | Nguyen et al. |
| 11,732,490 B2 | 8/2023 | Achor et al. |
| 11,811,361 B1 | 11/2023 | Farhangi et al. |
| 11,824,486 B2 | 11/2023 | Nguyen et al. |
| 11,824,487 B2 | 11/2023 | Nguyen et al. |
| 11,843,067 B2 | 12/2023 | Nguyen et al. |
| 2002/0050287 A1* | 5/2002 | Yamada ............ B32B 17/10788<br>136/251 |
| 2002/0053360 A1 | 5/2002 | Kinoshita et al. |
| 2002/0129849 A1 | 9/2002 | Heckeroth |
| 2003/0101662 A1 | 6/2003 | Ullman |
| 2003/0132265 A1 | 7/2003 | Villela et al. |
| 2003/0217768 A1 | 11/2003 | Guha |

(56) References Cited

U.S. PATENT DOCUMENTS

| | | |
|---|---|---|
| 2004/0000334 A1 | 1/2004 | Ressler |
| 2004/0074156 A1* | 4/2004 | Haynes .................. E04D 1/36 52/58 |
| 2005/0030187 A1 | 2/2005 | Peress et al. |
| 2005/0115603 A1 | 6/2005 | Yoshida et al. |
| 2005/0144870 A1 | 7/2005 | Dinwoodie |
| 2005/0178428 A1 | 8/2005 | Laaly et al. |
| 2005/0193673 A1 | 9/2005 | Rodrigues et al. |
| 2006/0042683 A1 | 3/2006 | Gangemi |
| 2006/0046084 A1 | 3/2006 | Yang et al. |
| 2006/0166023 A1* | 7/2006 | Yoshikata ......... B32B 17/10018 428/702 |
| 2007/0074757 A1 | 4/2007 | Mellott et al. |
| 2007/0181174 A1 | 8/2007 | Ressler |
| 2007/0193618 A1 | 8/2007 | Bressler et al. |
| 2007/0249194 A1 | 10/2007 | Liao |
| 2007/0295385 A1 | 12/2007 | Sheats et al. |
| 2008/0006323 A1 | 1/2008 | Kalkanoglu et al. |
| 2008/0035140 A1 | 2/2008 | Placer et al. |
| 2008/0315061 A1 | 2/2008 | Placerl. et al. |
| 2008/0078440 A1 | 4/2008 | Lim et al. |
| 2008/0185748 A1 | 8/2008 | Kalkanoglu |
| 2008/0271774 A1 | 11/2008 | Kalkanoglu et al. |
| 2008/0302030 A1 | 12/2008 | Stancel et al. |
| 2009/0000222 A1 | 1/2009 | Kalkanoglu et al. |
| 2009/0014057 A1 | 1/2009 | Croft et al. |
| 2009/0014058 A1 | 1/2009 | Croft et al. |
| 2009/0019795 A1 | 1/2009 | Szacsvay et al. |
| 2009/0044850 A1 | 2/2009 | Kimberley |
| 2009/0114261 A1 | 5/2009 | Stancel et al. |
| 2009/0133340 A1 | 5/2009 | Shiao et al. |
| 2009/0159118 A1 | 6/2009 | Kalkanoglu et al. |
| 2009/0178350 A1 | 7/2009 | Kalkanoglu et al. |
| 2009/0229652 A1 | 9/2009 | Mapel et al. |
| 2009/0275247 A1 | 11/2009 | Richter et al. |
| 2010/0019580 A1 | 1/2010 | Croft et al. |
| 2010/0095618 A1 | 4/2010 | Edison et al. |
| 2010/0101634 A1 | 4/2010 | Frank et al. |
| 2010/0116325 A1 | 5/2010 | Nikoonahad |
| 2010/0131108 A1 | 5/2010 | Meyer |
| 2010/0139184 A1 | 6/2010 | Williams et al. |
| 2010/0146878 A1 | 6/2010 | Koch et al. |
| 2010/0159221 A1 | 6/2010 | Kourtakis et al. |
| 2010/0170169 A1* | 7/2010 | Railkar .................. H10F 19/90 52/173.3 |
| 2010/0186798 A1 | 7/2010 | Tormen et al. |
| 2010/0242381 A1 | 9/2010 | Jenkins |
| 2010/0313499 A1 | 12/2010 | Gangemi |
| 2010/0325976 A1 | 12/2010 | DeGenfelder et al. |
| 2010/0326488 A1 | 12/2010 | Aue et al. |
| 2010/0326501 A1 | 12/2010 | Zhao et al. |
| 2011/0030761 A1 | 2/2011 | Kalkanoglu et al. |
| 2011/0036386 A1 | 2/2011 | Browder |
| 2011/0036389 A1 | 2/2011 | Hardikar et al. |
| 2011/0048507 A1 | 3/2011 | Livsey et al. |
| 2011/0058337 A1 | 3/2011 | Han et al. |
| 2011/0061326 A1 | 3/2011 | Jenkins |
| 2011/0100436 A1 | 5/2011 | Cleereman et al. |
| 2011/0104488 A1 | 5/2011 | Muessig et al. |
| 2011/0132427 A1 | 6/2011 | Kalkanoglu et al. |
| 2011/0168238 A1 | 7/2011 | Metin et al. |
| 2011/0239555 A1 | 10/2011 | Cook et al. |
| 2011/0302859 A1 | 12/2011 | Crasnianski |
| 2011/0314753 A1 | 12/2011 | Farmer et al. |
| 2012/0034799 A1 | 2/2012 | Hunt |
| 2012/0060434 A1 | 3/2012 | Jacobs |
| 2012/0060902 A1 | 3/2012 | Drake |
| 2012/0085392 A1 | 4/2012 | Albert et al. |
| 2012/0137600 A1 | 6/2012 | Jenkins |
| 2012/0176077 A1 | 7/2012 | Oh et al. |
| 2012/0212065 A1 | 8/2012 | Cheng et al. |
| 2012/0233940 A1 | 9/2012 | Perkins et al. |
| 2012/0240490 A1 | 9/2012 | Gangemi |
| 2012/0260977 A1 | 10/2012 | Stancel |
| 2012/0266942 A1 | 10/2012 | Komatsu et al. |
| 2012/0279150 A1 | 11/2012 | Pislkak et al. |
| 2012/0282437 A1 | 11/2012 | Clark et al. |
| 2012/0291848 A1 | 11/2012 | Sherman et al. |
| 2013/0008499 A1 | 1/2013 | Verger et al. |
| 2013/0014455 A1 | 1/2013 | Grieco |
| 2013/0118558 A1 | 5/2013 | Sherman |
| 2013/0193769 A1 | 8/2013 | Mehta et al. |
| 2013/0247988 A1 | 9/2013 | Reese et al. |
| 2013/0284267 A1 | 10/2013 | Plug et al. |
| 2013/0306137 A1 | 11/2013 | Ko |
| 2014/0090697 A1 | 4/2014 | Rodrigues et al. |
| 2014/0150843 A1 | 6/2014 | Pearce et al. |
| 2014/0173997 A1 | 6/2014 | Jenkins |
| 2014/0179220 A1 | 6/2014 | Railkar et al. |
| 2014/0182222 A1 | 7/2014 | Kalkanoglu et al. |
| 2014/0208675 A1 | 7/2014 | Beerer et al. |
| 2014/0254776 A1 | 9/2014 | O'Connor et al. |
| 2014/0266289 A1 | 9/2014 | Della Sera et al. |
| 2014/0311556 A1 | 10/2014 | Feng et al. |
| 2014/0352760 A1 | 12/2014 | Haynes et al. |
| 2014/0366464 A1 | 12/2014 | Rodrigues et al. |
| 2015/0083197 A1 | 3/2015 | Langmaid et al. |
| 2015/0089895 A1 | 4/2015 | Leitch |
| 2015/0129032 A1 | 5/2015 | Cleereman et al. |
| 2015/0162459 A1 | 6/2015 | Lu et al. |
| 2015/0184394 A1 | 7/2015 | Nark |
| 2015/0340516 A1 | 11/2015 | Kim et al. |
| 2015/0349173 A1 | 12/2015 | Morad et al. |
| 2016/0105144 A1* | 4/2016 | Haynes .................. H02S 40/32 136/244 |
| 2016/0142008 A1 | 5/2016 | Lopez et al. |
| 2016/0254776 A1 | 9/2016 | Rodrigues et al. |
| 2016/0276508 A1 | 9/2016 | Huang et al. |
| 2016/0359451 A1 | 12/2016 | Mao et al. |
| 2017/0126171 A1 | 5/2017 | Fisher et al. |
| 2017/0159292 A1 | 6/2017 | Chihlas et al. |
| 2017/0179319 A1 | 6/2017 | Yamashita et al. |
| 2017/0179726 A1 | 6/2017 | Garrity et al. |
| 2017/0237390 A1 | 8/2017 | Hudson et al. |
| 2017/0331415 A1 | 11/2017 | Koppi et al. |
| 2018/0094438 A1 | 4/2018 | Wu et al. |
| 2018/0097472 A1 | 4/2018 | Anderson et al. |
| 2018/0115275 A1 | 4/2018 | Flanigan et al. |
| 2018/0254738 A1 | 9/2018 | Yang et al. |
| 2018/0294765 A1 | 10/2018 | Friedrich et al. |
| 2018/0351502 A1 | 12/2018 | Almy et al. |
| 2018/0367089 A1 | 12/2018 | Stutterheim et al. |
| 2019/0030867 A1 | 1/2019 | Sun et al. |
| 2019/0081436 A1 | 3/2019 | Onodi et al. |
| 2019/0123679 A1 | 4/2019 | Rodrigues et al. |
| 2019/0253022 A1 | 8/2019 | Hardar et al. |
| 2019/0305717 A1 | 10/2019 | Allen et al. |
| 2020/0109320 A1 | 4/2020 | Jiang |
| 2020/0144958 A1 | 5/2020 | Rodrigues et al. |
| 2020/0220819 A1 | 7/2020 | Vu et al. |
| 2020/0224419 A1 | 7/2020 | Boss et al. |
| 2020/0343397 A1 | 10/2020 | Hem-Jensen |
| 2021/0083619 A1 | 3/2021 | Hegedus |
| 2021/0115223 A1 | 4/2021 | Bonekamp et al. |
| 2021/0159353 A1 | 5/2021 | Li et al. |
| 2021/0301536 A1 | 9/2021 | Baggs et al. |
| 2021/0343886 A1 | 11/2021 | Sharenko et al. |
| 2022/0060141 A1 | 2/2022 | Felton |
| 2022/0149213 A1 | 5/2022 | Mensink et al. |

FOREIGN PATENT DOCUMENTS

| | | |
|---|---|---|
| CN | 202797032 U | 3/2013 |
| CN | 217150978 U | 8/2022 |
| DE | 1958248 A1 | 11/1971 |
| EP | 0104582 A2 * | 4/1984 |
| EP | 1039361 A1 | 9/2000 |
| EP | 1837162 A1 | 9/2007 |
| EP | 1774372 A1 | 7/2011 |
| EP | 2446481 A2 | 5/2012 |
| EP | 2784241 A1 | 10/2014 |
| EP | 3772175 A1 | 2/2021 |
| JP | 10046767 A | 2/1998 |
| JP | 2002-106151 A | 4/2002 |

(56) References Cited

FOREIGN PATENT DOCUMENTS

| | | |
|---|---|---|
| JP | 2001-098703 A | 10/2002 |
| JP | 2017-027735 A | 2/2017 |
| JP | 2018053707 A | 4/2018 |
| KR | 20090084060 A | 8/2009 |
| KR | 10-1348283 B1 | 1/2014 |
| KR | 10-2019-0000367 A | 1/2019 |
| KR | 10-2253483 B1 | 5/2021 |
| NL | 2026856 B1 | 6/2022 |
| WO | 2010/151777 A2 | 12/2010 |
| WO | 2011/049944 A1 | 4/2011 |
| WO | 2015/133632 A1 | 9/2015 |
| WO | 2018/000589 A1 | 1/2018 |
| WO | 2019/201416 A1 | 10/2019 |
| WO | 2020-159358 A1 | 8/2020 |
| WO | 2021-247098 A1 | 12/2021 |

OTHER PUBLICATIONS

RGS Energy, 3.5kW Powerhouse 3.0 system installed in an afternoon; Jun. 7, 2019 <<facebook.com/RGSEnergy/>> retrieved Feb. 2, 2021.
Tesla, Solar Roof <<tesla.com/solarroof>> retrieved Feb. 2, 2021.
"Types of Roofing Underlayment", Owens Corning Roofing; <<https://www.owenscorning.com/en-us/roofing/tools/how-roofing-underlayment-helps-protect-your-home>> retrieved Nov. 1, 2021.

\* cited by examiner

ROOFING SYSTEMS WITH WATER INGRESS PROTECTION

CROSS-REFERENCE TO RELATED APPLICATION

This application is a Section 111 (a) application relating to and claiming the benefit of commonly owned, U.S. Provisional Patent Application Ser. No. 63/593,361, filed Oct. 26, 2023, entitled "ROOFING SYSTEM INCLUDING PHOTOVOLTAIC MODULE AND ROOFING MODULE," the contents of which is incorporated herein by reference in its entirety.

FIELD

The present disclosure is directed to a roofing system, and, more specifically, a roofing system that includes a photovoltaic module and a roofing module with water ingress protection features.

BACKGROUND

A roofing system includes one or more photovoltaic modules and one or more roofing modules (e.g., non-photovoltaic modules) installed on a roof deck. It is desirable to prevent water, such as rain, from leaking between the modules.

SUMMARY

The Claims, rather than the Summary, define covered embodiments of the present disclosure. The Summary is a high-level overview of various aspects of the disclosure, and introduces some concepts that are further described in the Detailed Description below. The Summary is not intended to identify key or essential features of the claimed subject matter, and also is not intended to be used in isolation to determine the scope of the claimed subject matter. Instead, the claimed subject matter should be understood by reference to appropriate portions of the Specification and drawings, as well as to each claim.

In some embodiments, a roofing system includes a roof deck; at least one photovoltaic module, wherein the at least one photovoltaic module includes a first photovoltaic module installed on the roof deck in a first row, wherein the first photovoltaic module includes at least one solar cell, wherein the first photovoltaic module includes a sealant; and at least one fastener, wherein the at least one fastener includes a first fastener that penetrates at least the sealant and the roof deck.

In some embodiments, the first photovoltaic module includes two layers, and wherein the sealant is between the two layers. In some embodiments, the first photovoltaic module includes an encapsulant, wherein the encapsulant encapsulates the at least one solar cell, and a backsheet, wherein the backsheet is juxtaposed with the encapsulant, and wherein the sealant is juxtaposed with a surface of the backsheet. In some embodiments, the sealant includes a butyl adhesive. In some embodiments, the first fastener includes at least one of a nail, screw, rivet, clip, or staple. In some embodiments, the at least one fastener includes a second fastener, wherein the second fastener penetrates the first photovoltaic module and the roof deck without penetrating the sealant. In some embodiments, the system further includes at least one roofing module, wherein the at least one roofing module includes a first roofing module installed on the roof deck in the first row, and a flashing installed under an end of the first photovoltaic module and an end of the first roofing module, and wherein the first fastener penetrates the flashing. In some embodiments, an end of the sealant extends past an end of the flashing.

In some embodiments, a roofing system includes a roof deck; at least one photovoltaic module, wherein the at least one photovoltaic module includes a first photovoltaic module installed on the roof deck in a first row, wherein the first photovoltaic module includes at least one solar cell; at least one roofing module, wherein the at least one roofing module includes a first roofing module installed on the roof deck in the first row, wherein the first roofing module includes a first layer, wherein the first layer has a length and a width, wherein the width is less than the length; and a sealant, wherein the sealant is juxtaposed with the first layer, wherein the sealant has a length that is less than the length of the first layer, wherein an end of the first roofing module abuts an end of the first photovoltaic module; and at least one fastener, wherein the at least one fastener includes a first fastener that penetrates at least the sealant, the end of the first roofing module, and the roof deck.

In some embodiments, the first roofing module includes a second layer, and wherein the sealant is between the first layer and the second layer. In some embodiments, the roofing system further includes a flashing installed under the end of the first roofing module and the end of the first photovoltaic module, and wherein the first fastener penetrates the first flashing. In some embodiments, an end of the sealant extends past an end of the flashing.

In some embodiments, a roofing system includes a roof deck; at least one roofing module, wherein the at least one roofing module includes a first roofing module installed on the roof deck, wherein the first roofing module includes a first layer, wherein the first layer includes a reveal portion and a headlap portion, wherein the headlap portion includes a nail zone, and a second layer attached to the first layer, wherein the second layer overlays the headlap portion of the first layer; and at least one fastener, wherein the at least one fastener includes a first fastener, the first fastener comprising a head and a shaft extending from the head, wherein the shaft penetrates the nail zone of the first roofing module and the roof deck, and wherein the head is between the first layer of the first roofing module and the second layer of the first roofing module.

In some embodiments, the second layer comprises a polymer. In some embodiments, the second layer comprises ethylene tetrafluoroethylene (ETFE). In some embodiments, an end of the second layer extends beyond an end of the headlap portion of the first layer. In some embodiments, the first roofing module is installed on the roof deck in first row, wherein the at least one roofing module includes a second roofing module installed on the roof deck in a second row above the first row, wherein second roofing module at least partially overlaps the first roofing module, wherein the second layer of the first roofing module is between the first layer of the first roofing module and the second roofing module. In some embodiments, the first roofing module includes a third layer, wherein the first layer is between the second layer and the third layer, wherein the third layer comprises one of thermoplastic polyolefin or continuous fiber thermoplastic. In some embodiments, the first layer is composed of a polymer. In some embodiments, each of the first roofing module and the second roofing module includes a first adhesive line, wherein the first adhesive line is juxtaposed with the first layer, and a second adhesive line, wherein the second adhesive line is juxtaposed with the first layer, wherein the first adhesive line and the second adhesive line of the second roofing module contact the first roofing module.

BRIEF DESCRIPTION OF THE DRAWINGS

This section refers to the drawings that form a part of this disclosure, and which illustrate some of the embodiments of structure, materials, and/or methods of the present disclosure described herein.

DETAILED DESCRIPTION

In addition to the benefits and improvements that the Specification discloses, other objects and advantages that the Specification provides will become apparent from the following description taken in conjunction with the accompanying figures. Although the description discloses and describes detailed embodiments of the present disclosure, the disclosed embodiments are merely illustrative of the disclosure that may be embodied in various forms. In addition, each of the examples given regarding the various embodiments of the disclosure are intended to be illustrative, and not restrictive.

As used herein, a "steep slope" roof or roof deck is a roof or roof deck having a pitch of Y/X, where Y and X are in a ratio of 4:12 to 20:12, where Y corresponds to the "rise" of the roof or roof deck, and where X corresponds to the "run" of the roof or roof deck.

As used herein, a "sloped" roof or roof deck is a pitched roof or roof deck, but the pitch is less than that of a steep slope roof or roof deck, and is not a flat roof or roof deck.

In some embodiments, the present disclosure includes a roofing system. In some embodiments, the roofing system includes one or more photovoltaic modules, and/or one or more roofing materials other than photovoltaic modules, such as non-photovoltaic modules, roofing modules, or roofing shingles, installed above a roof deck. In some embodiments, the roof deck is a sloped roof deck. In some embodiments, the sloped roof deck is a steep slope roof deck.

In some embodiments, the photovoltaic module includes a structure, composition, components, and/or function similar to those of one or more embodiments of the photovoltaic modules and shingles disclosed, shown, and/or described in any or all of: U.S. application Ser. No. 17/831,307, filed Jun. 2, 2022, titled "Roofing Module System," and published under U.S. Patent Application Publication No. 2022-0393637 on Dec. 8, 2022, owned by GAF Energy LLC; U.S. application Ser. No. 18/169,718, filed Feb. 15, 2023, titled "Roofing Module System," and published under U.S. Patent Application Publication No. 2023-0203815 on Jun. 29, 2023, owned by GAF Energy LLC; PCT International Patent Publication No. WO 2022/051593, Application No. PCT/US2021/049017, published Mar. 10, 2022, titled "Building Integrated Photovoltaic System," owned by GAF Energy LLC; U.S. Pat. No. 11,251,744 to Bunea et al., issued Feb. 15, 2022, titled "Photovoltaic Shingles and Methods of Installing Same," owned by GAF Energy LLC; and/or U.S. Pat. No. 11,870,227, issued Jan. 9, 2024, entitled "Building Integrated Photovoltaic System," owned by GAF Energy LLC; the disclosures of each of the foregoing are incorporated by reference herein in their entireties.

In some embodiments, the non-photovoltaic, roofing module or roofing shingle includes a structure, composition, components, and/or function similar to those of one or more embodiments of roofing materials disclosed, shown, and/or described in either or both of U.S. application Ser. No. 17/831,307, filed Jun. 2, 2022, titled "Roofing Module System," and published under U.S. Patent Application Publication No. 2022-0393637 on Dec. 8, 2022, owned by GAF Energy LLC; U.S. application Ser. No. 18/169,718, filed Feb. 15, 2023, titled "Roofing Module System," and published under U.S. Patent Application Publication No. 2023-0203815 on Jun. 29, 2023, owned by GAF Energy; and/or U.S. application Ser. No. 18/352,894, filed Jul. 14, 2023, titled "Solar Roofing System with Fiber Composite Roofing Shingles," and published under U.S. Patent Application Publication No. 2024-0018781 on Jan. 18, 2024, owned by GAF Energy LLC; the disclosures of each of the foregoing are incorporated by reference herein in their entireties.

Figure 1:
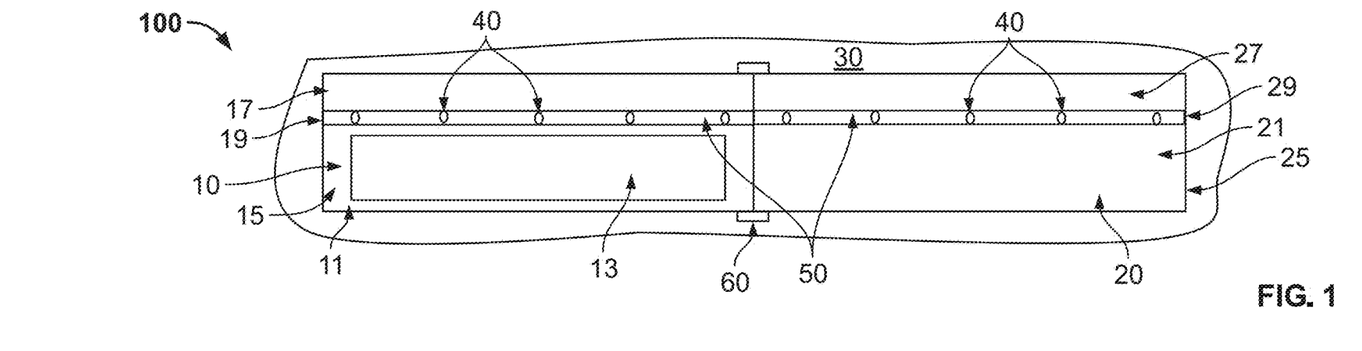
FIGS. 1 through 6 illustrate schematic views of a portion of a roofing system, according to some embodiments.

With reference to the figures, FIG. 1 illustrates a schematic view of a portion of a roofing system 100, according to some embodiments. As shown in the figure, in some embodiments, the roofing system 100 shows a portion of one module row, with one photovoltaic module 10 and one roofing module 20 (e.g., a non-photovoltaic module) installed on a roof deck 30. In some embodiments, the roof deck 30 is a sloped roof deck. In some embodiments, the sloped roof deck is a steep slope roof deck.

In some embodiments, as shown in the figure, the photovoltaic module 10 includes a backsheet 11, and at least one solar cell 13 above the backsheet 11. In some embodiments, the backsheet 11 is a single layer. In some embodiments, the backsheet 11 is more than one layer. In some embodiments, the at least one solar cell 13 is one solar cell. In some embodiments, the at least one solar cell 13 is more than one solar cell. In some embodiments, the photovoltaic module 10 includes an encapsulant encapsulating the solar cell 13. In some embodiments, the encapsulant is juxtaposed with a surface of the backsheet 11.

As the figure shows, in some embodiments, the backsheet 11 includes a reveal portion 15 and a headlap portion 17. In some embodiments, the headlap portion 17 includes a nail zone 19. In some embodiments, the reveal portion 15 remains exposed to the environment and visually observable after the roofing system 100 is complete. In some embodiments, the headlap portion 17 is covered when the roofing system 100 is complete, such as by one or more other ones of the photovoltaic modules 10 and/or one or more of the roofing modules 20, or by other roofing shingles such as asphalt, non-asphaltic, polymer, and/or metal roofing shingles, and thus the headlap portion 17 is not exposed to the environment and/or visually observable after the roofing system 100 is complete. In some embodiments, the nail zone 19 receives fasteners (as further described below), and is covered, such as by one or more other ones of the photovoltaic modules 10 and/or one or more of the roofing modules 20 or roofing shingles described above, and thus is not exposed to the environment and/or visually observable after the roofing system 100 is complete. In some embodiments, at least a portion of the headlap portion 17 is covered when the roofing system 100 is complete.

In some embodiments, as shown in the figure, the roofing module 20 includes a first layer 21. In some embodiments, the first layer 21 includes a reveal portion 25 and a headlap portion 27. In some embodiments, the headlap portion 27 includes a nail zone 29. In some embodiments, the reveal portion 25 remains exposed to the environment and visually observable after the roofing system 100 is complete. In some embodiments, the headlap portion 27 is covered, such as by one or more of the photovoltaic modules 10 and/or one or more other ones of the roofing modules 20 or roofing shingles described above, and thus is not exposed to the environment and/or visually observable after the roofing system 100 is complete. In some embodiments, the nail zone 29 receives fasteners (as described below), and is covered, such as by one or more of the photovoltaic modules 10 and/or one or more other ones of the roofing modules 20 or roofing shingles as described above, and thus is not exposed to the environment and/or visually observable after the roofing system 100 is complete. In some embodiments, at least a portion of the headlap portion 27 is covered when the roofing system 100 is complete.

As shown in the figure, in some embodiments, the photovoltaic module 10 and the roofing module 20 abut one another, (e.g., ends of the photovoltaic module 10 and the roofing module 20 contact one another, without overlapping). In some embodiments, the roofing system 100 includes an underlayment installed between the roof deck 30, and the photovoltaic module 10 and/or the roofing module 20. Although the figure shows that the portion of the roofing system 100 includes only one photovoltaic module 10 and one roofing module 20, the roofing system 100 includes any number of the photovoltaic modules 10 and/or the roofing modules 20 installed on the roof deck 30, and, in some embodiments, the roofing system 100 includes a sufficient number of photovoltaic modules 10 and/or the roofing modules 20 are installed so as to cover the roof deck 30. In some embodiments, one or more photovoltaic modules 10 and/or one or more roofing modules 20 are installed in a same module row that FIG. 1 shows. In some embodiments, one or more photovoltaic modules 10 and/or one or more roofing modules 20 are installed in one or more additional module rows, such as above and/or below the module row that FIG. 1 shows.

In some embodiments, as the figure shows, the roofing system 100 includes one or more fasteners 40, which penetrate the photovoltaic module 10 and/or the roofing module 20, thereby to install the photovoltaic module 10 and/or the roofing module 20 to the roof deck 30. In some embodiments, the fasteners 40 penetrate the roof deck 30. In some embodiments, one or more of the fasteners 40 includes a shaft connected to a head, and the shaft of the fastener 40 penetrates either or both of the photovoltaic module 10 and/or the roofing module 20, along with the roof deck 30; while the head of the fastener 40 contacts a top surface of the photovoltaic module 10 or the roofing module 20. In some embodiments, the fasteners 40 include one or more of a nail or nails, a screw or screws, a rivet or rivets, a clip or clips, or a staple or staples, or combinations thereof.

In some embodiments, either or both of the photovoltaic module 10 and/or the roofing module 20 includes a sealant 50. In some embodiments, the sealant 50 is configured to seal holes that the fasteners 40 form during penetration of the nail zone 29 and/or the nail zone 19. In some embodiments, the sealant 50 includes an adhesive. In some embodiments, the adhesive includes one or more of a butyl adhesive, bitumen-based sealant, polymer-modified bitumen sealant, chloroform adhesive, acrylic adhesive, polyurethane adhesive, epoxy, solvent-based adhesive, emulsion adhesive, cyanoacrylate, and combinations thereof. In some embodiments, the sealant 50 includes a film covering an adhesive. In some embodiments, the film includes a polymer. In some embodiments, the film is removed before or after the fasteners 40 penetrate the adhesive. In some embodiments, the film remains on the adhesive (e.g., the film is not removed from the adhesive, such as before being covered by one or more photovoltaic modules 10 and/or roofing modules 20).

In some embodiments, the roofing system 100 includes a flashing 60 under ends of the photovoltaic module 10 and the roofing module 20. In some embodiments, the flashing 60 is a flat plate. In some embodiments, a material of the flashing 60 is a polymer, a metal, or a combination thereof. In some embodiments, at least one of the fasteners 40 penetrates the flashing 60. In some embodiments, the fasteners 40 do not penetrate the flashing 60. In some embodiments, the roofing system 100 omits the flashing 60.

In some embodiments, as FIG. 1 shows, the sealant 50 is on a surface of the photovoltaic module 10 and/or roofing module 20. In some embodiments, the sealant 50 is on an uppermost or top surface of the photovoltaic module 10 and/or the roofing module 20, such that the sealant 50 is visible to the installer during installation of the photovoltaic module 10 and/or the roofing module 20 on the roof deck 30. In some embodiments, the sealant 50 is on a lowermost or bottom surface of the photovoltaic module 10 and/or the roofing module 20, (e.g., the surface which is closer to the roof deck 30 than any other surface of the photovoltaic module 10 and/or the roofing module 20). In some embodiments, when the sealant 50 is not visible to the installer during installation, the photovoltaic module 10 and/or the roofing module 20 includes indicia identifying the nail zone 19 and/or the nail zone 29, so that when the fasteners 40 penetrate the indicated nail zone 19 and/or the nail zone 29, the fasteners 40 penetrate the sealant 50. In some embodiments, the photovoltaic module 10 and/or the roofing module 20 include two or more layers, and the sealant 50 is between two layers, such that the sealant 50 is within an interior of the photovoltaic module 10 and/or the roofing module 20, and not visible to the installer.

Figure 2:
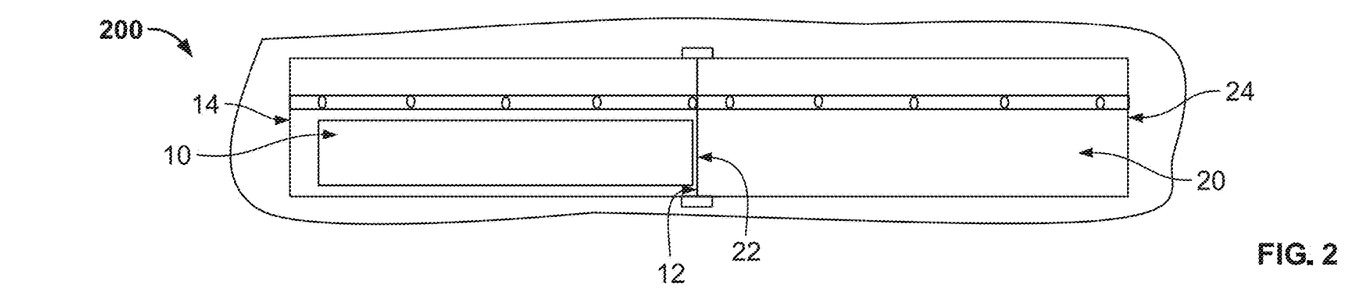
Figure 3:
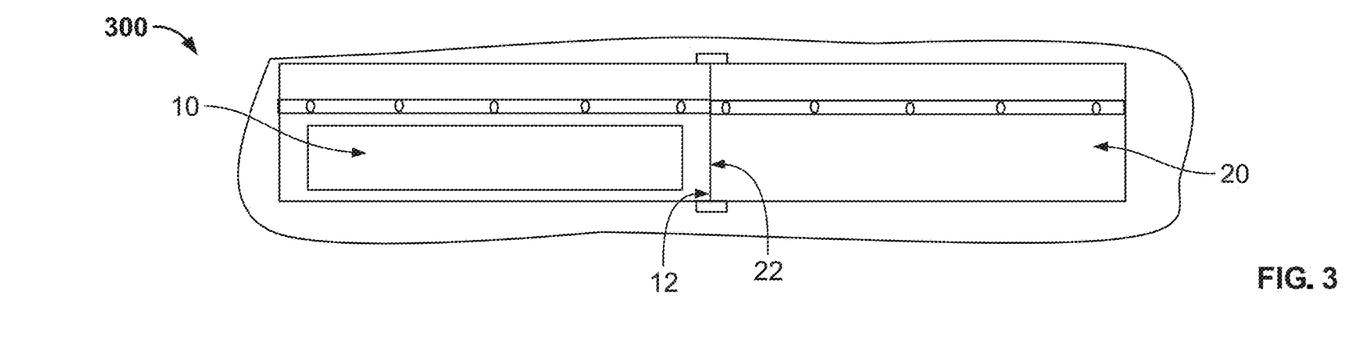

FIGS. 2 and 3 illustrate schematic views of portions of roofing systems, according to some embodiments. These figures differ from FIG. 1 in that FIG. 2 illustrates an embodiment of a roofing system 200 in which an end 22 or side lap of the roofing module 20 overlaps an end 12 or side lap of the photovoltaic module 10 (e.g., an end of the roofing module 20 covers or is on top of an end of the photovoltaic module 10), while FIG. 3 illustrates an embodiment of a roofing system 300 in which the end 22 of the photovoltaic module 10 overlaps the end 12 of the roofing module 20 (e.g., an end of the photovoltaic module 10 covers or is on top of an end of the roofing module 20). In some embodiments, the roofing system 200 and/or the roofing system 300 includes the fasteners 40, the sealant 50 on either or both of the roofing module 20 and/or the photovoltaic module 10, and/or the flashing 60. In some embodiments, a roofing system includes the photovoltaic modules 10 and the roofing modules 20 illustrated and/or arranged as any or all of those shown in FIGS. 1 through 3. For example, in some embodiments, a roofing system includes one or more of the photovoltaic modules 10 and one or more of the roofing modules 20 that abut one another, one or more of the photovoltaic modules 10 that overlap one or more ends or side laps of the roofing modules 20, and/or one or more of the roofing modules 20 that overlap ends or side laps of one or more of the photovoltaic modules 10.

Figure 4:
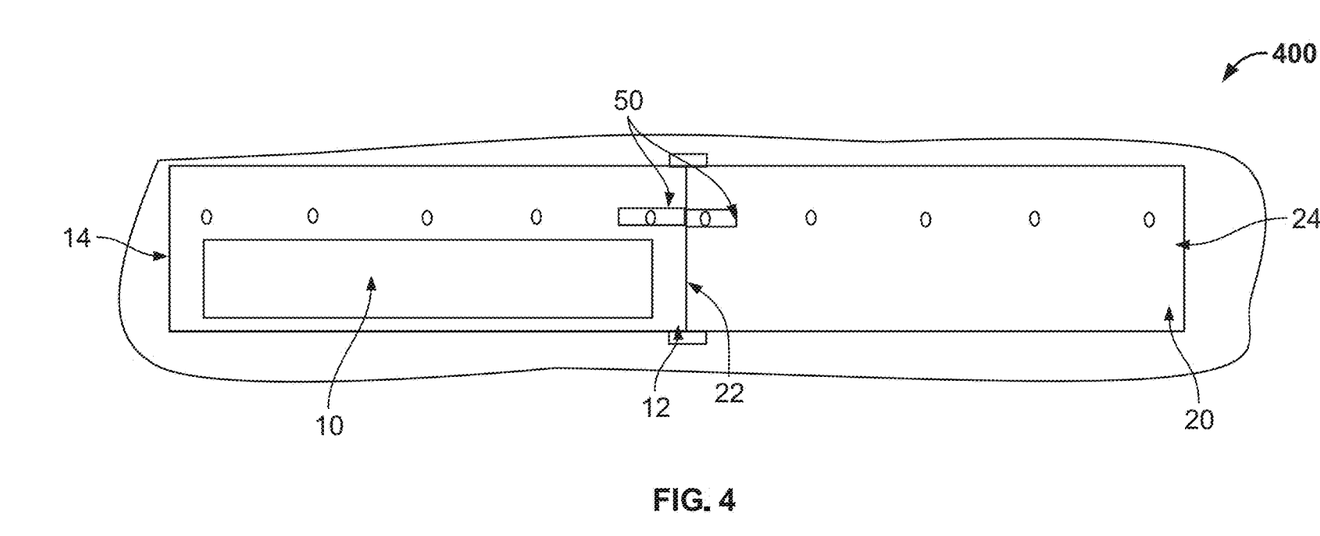

FIG. 4 is a schematic view of a portion of a roofing system 400, according to some embodiments. In each of FIGS. 1 through 3, the sealant 50 extends along the entire length of the photovoltaic modules 10 and the roofing modules 20. As FIG. 4 shows, in some embodiments, in the roofing system 400, the sealant 50 does not extend across an entire length of the roofing module 20, and/or does not extend across an entire length of the photovoltaic module 10. In some embodiments, the sealant 50 extends from and/or between ends 22, 24 of the roofing module 20. In some embodiments, the sealant 50 extends from and/or between ends 12, 14 of the photovoltaic module 10. In some embodiments, either or both of the roofing module 20 and/or the photovoltaic module 10 includes the sealant 50 at or between ends 22, 24 and/or ends 12, 14, respectively, thereof. In some embodiments, in the roofing system 400, the roofing module 20 and the photovoltaic module 10 abut (as FIG. 1 shows), and/or overlap (as FIGS. 2 and 3 show). In some embodiments, one or more of the photovoltaic modules 10 and/or one or more of the roofing modules 20 include the sealant 50 on both ends, on one end, and/or omit the sealant 50. In some embodiments, the sealant 50 extends past an end of the flashing 60. In some embodiments, the sealant 50 does not extend past the end of the flashing 60. As FIG. 4 illustrates, in some embodiments, one or more of the fasteners 40 do not penetrate the sealant 50. In some embodiments, one or more of the roofing module 20 and/or one or more of the photovoltaic module 10 includes the sealant 50 at other locations, such as the locations of one or more of the other fasteners 40. Thus, in some embodiments, the sealant 50 is a series of dashes, for example.

Figure 5:
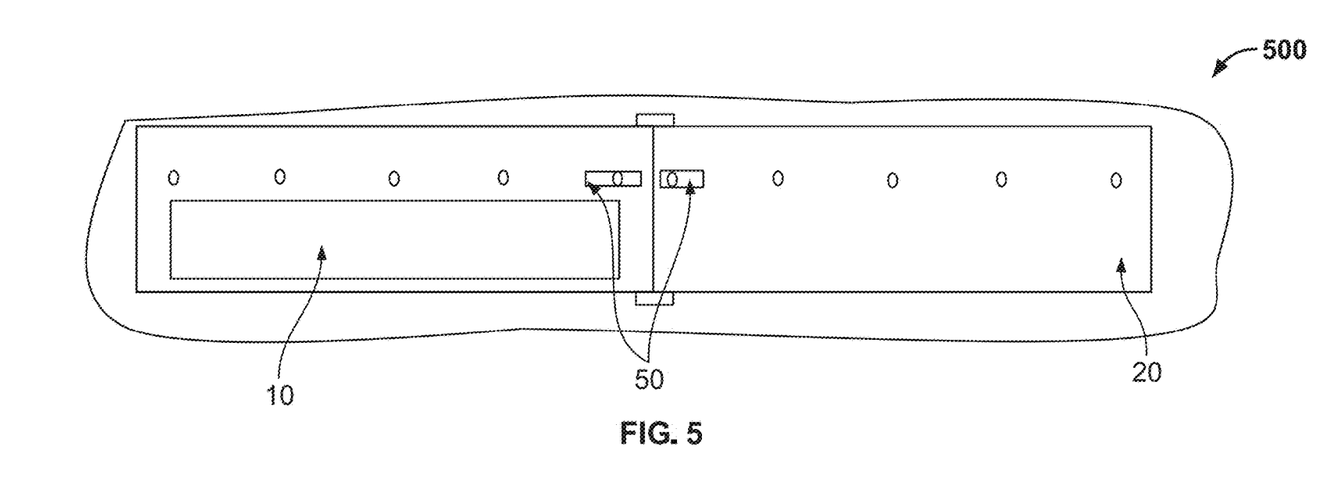

FIG. 5 is a schematic view of a portion of a roofing system 500, according to some embodiments. As the figure shows, in this embodiment, in the roofing system 500, the sealant 50 does not extend across an entire length of the roofing module 20, and/or does not extend across an entire length of the photovoltaic module 10. In this embodiment, the sealant 50 also does not extend to either or both ends 22, 24, of the roofing module 20 and/or either or both ends 12, 14, of the photovoltaic module 10. In some embodiments, the sealant 50 is spaced apart from one or both of the ends 22, 24 of the roofing module 20 and/or one or both of the ends 12, 14 of the photovoltaic module 10. In some embodiments, either or both of the roofing module 20 and/or the photovoltaic module 10 includes the sealant 50 at both of their respective ends thereof, with the sealant 50 spaced apart from both of the ends 22, 24 of the roofing module 20 and/or both of the ends 12, 124 of the photovoltaic module 10. In some embodiments, in the roofing system 500, the 22 end of the roofing module 20 and the end 12 of the photovoltaic module 10 abut (as FIG. 1 shows), and/or overlap (as FIGS. 2 and 3 show). In some embodiments, one or more of the photovoltaic modules 10 and/or one or more of the roofing modules 20 include the sealant 50 on both of their respective ends, on one respective end, and/or omit the sealant 50. In some embodiments, the sealant 50 extends past an end of the flashing 60. In some embodiments, the sealant 50 does not extend past the end of the flashing 60. As FIG. 5 illustrates, in some embodiments, one or more of the fasteners 40 do not penetrate the sealant 50. In some embodiments, one or more of the roofing module 20 and/or one or more of the photovoltaic module 10 includes the sealant 50 at other locations, such as the locations of one or more of the other fasteners 40. Thus, in some embodiments, the sealant 50 is a series of dashes, for example.

In some embodiments, a roofing system includes one or more of the components from FIGS. 1 through 5, or described above. Thus, for example, in some embodiments, the roofing system 100 includes one or more of the photovoltaic modules 10 and one or more of the roofing modules 20 that abut, one or more photovoltaic modules 10 that overlap the roofing modules 20, and/or one or more of the roofing modules 20 overlap one or more of the photovoltaic modules 10. In some embodiments, one or more of the photovoltaic modules 10 and/or one or more of the roofing modules 20 include the sealant 50 as shown and described, and/or omit the sealant 50.

Each of the above-described figures illustrates the roofing system with one module row on the roof deck 30. In some embodiments, one or more of the illustrated and described roofing systems includes one or more additional module rows above and/or below the illustrated module row. In some embodiments, the module row above the illustrated module row covers the headlap portions 17 and/or the headlap portions 27, of the photovoltaic modules 10 and/or the roofing modules 20, respectively, including the sealant 50 and/or the fasteners 40.

In some embodiments, one or more of the above described components, such as but not limited to the sealant 50, impedes water that flows between rows of photovoltaic modules 10 and/or other roofing modules 20 from flowing down holes made by the fasteners 40 into the roof deck 30.

Figure 6:
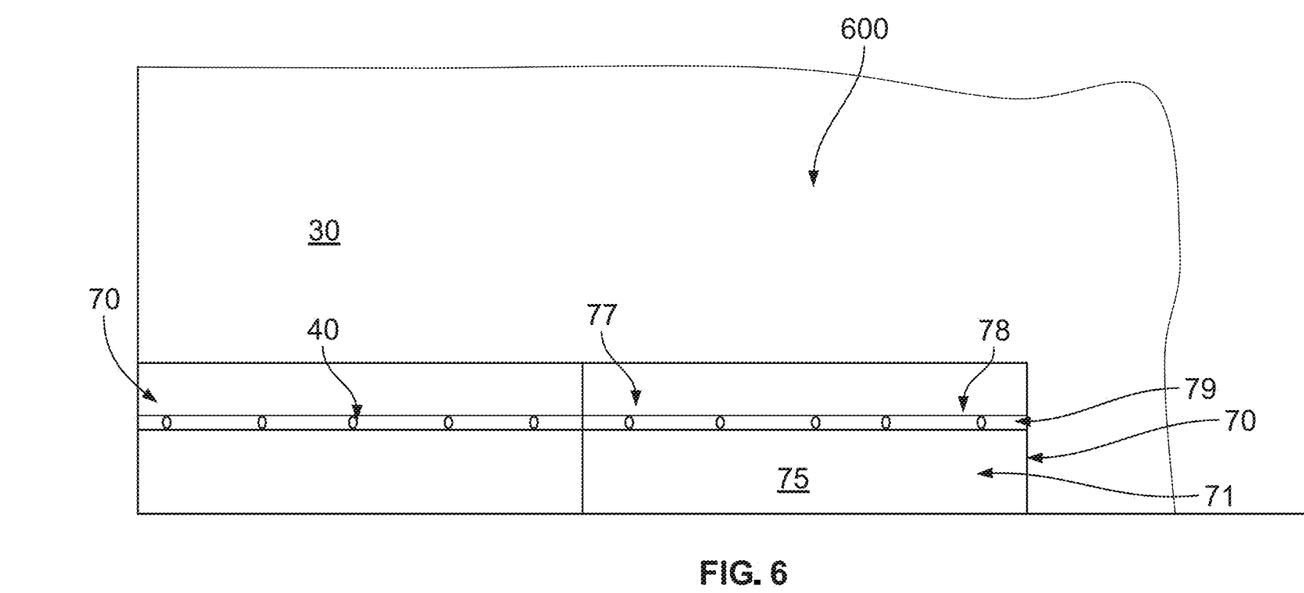
Figure 7:
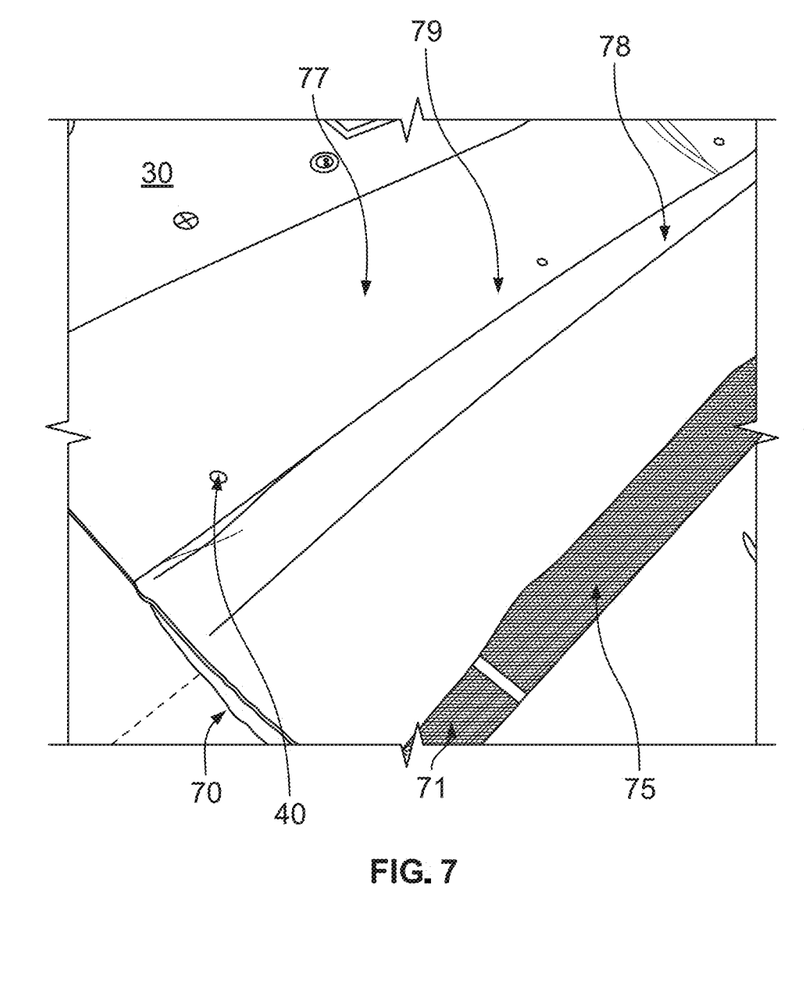
FIGS. 7 through 9 illustrate schematic, isometric views of a roofing module from the roofing system of FIG. 6, according to some embodiments.
Figure 8:
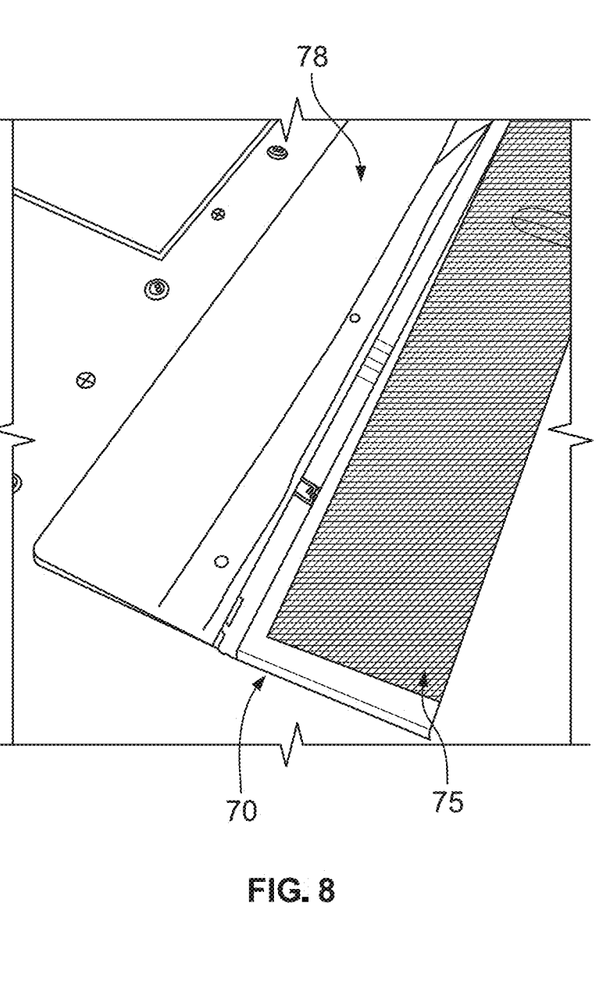
Figure 9:
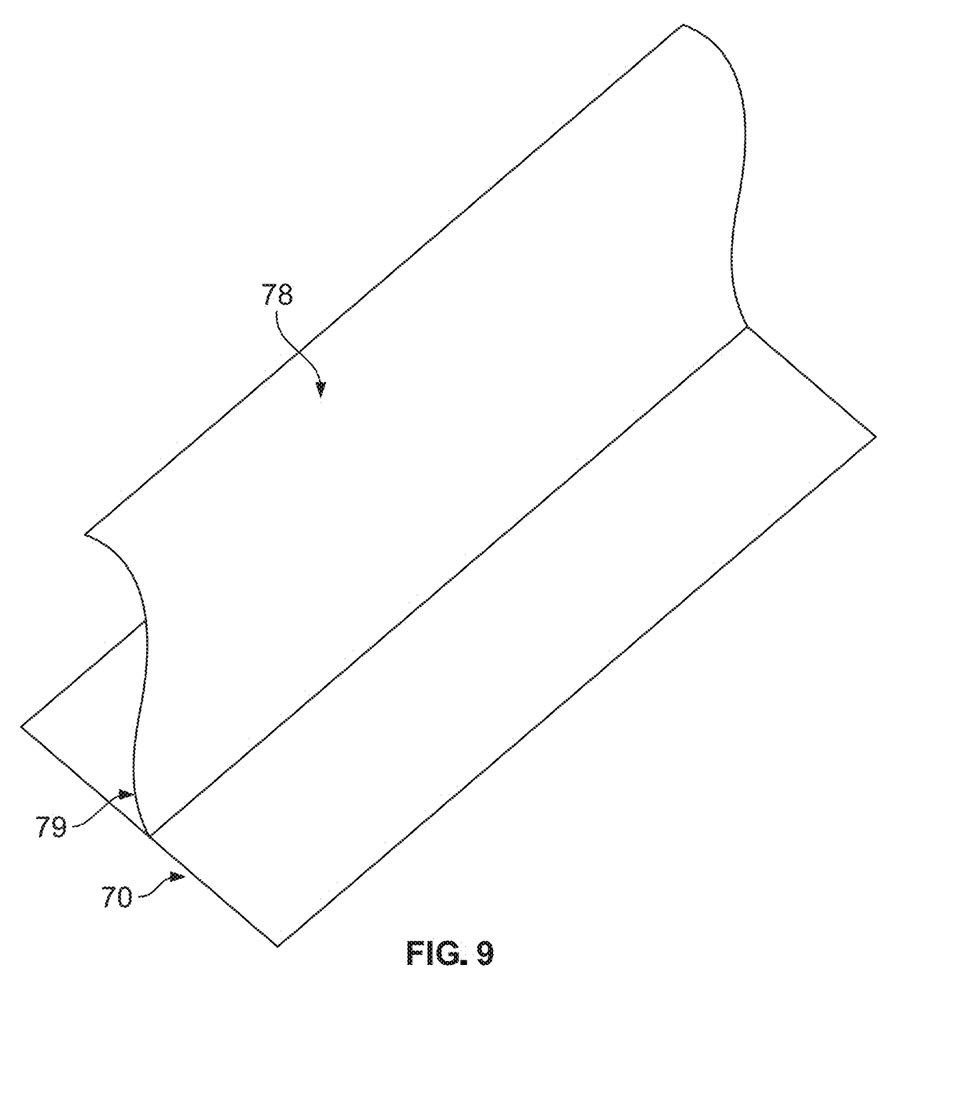

FIG. 6 is a schematic view of a portion of a roofing system, in accordance with some embodiments, and FIGS. 7 through 9 are schematic isometric views of a roofing module from the roofing system of FIG. 6, in accordance with some embodiments. As the figures show, a roofing system 600 includes a plurality of roofing modules 70 installed on the roof deck 30 with the fasteners 40. In some embodiments, the roofing module 70 includes a first layer 71. In some embodiments, the first layer 71 includes a reveal portion 75 and a headlap portion 77. In some embodiments, the headlap portion 77 includes a nail zone 79.

In some embodiments, the roofing module 70 includes a second layer 78. As FIGS. 7 and 8 show, in some embodiments, the second layer 78 is movable relative to the first layer 71, so as to cover or overlap the headlap portion 77, and so as to uncover the headlap portion 77. In some embodiments, one edge of the second layer 78 is attached to the first layer 71. In some embodiments, one edge of the second layer 78 is laminated to the first layer 71. In some embodiments, one edge of the second layer 78 is adhered to the first layer 71. In some embodiments, one edge of the second layer 78 is melted to the first layer 71. In some embodiments, an opposite edge of the second layer 78 is not attached to the first layer 71, and is free edge, such that the second layer 78 is movable relative to the first layer 71.

In some embodiments, prior to penetration of the nail zone 79 of the roofing module 70 with the fasteners 40, when installing the roofing module 70 to the roof deck 30, the second layer 78 is moved so as not to cover (e.g., to uncover or expose) the nail zone 79. In some embodiments, the fasteners 40 penetrate the nail zone 79 of the roofing module 70, thereby installing the roofing module 70 to the roof deck 30. In some embodiments, the fastener 40 includes a shaft that is connected to a head. In some embodiments, the shaft of the fastener penetrates the nail zone 79 and the roof deck 30, and the head of the fastener 40 contacts a top surface of the nail zone 79 of the roofing module 70. In some embodiments, after the fasteners 40 penetrate the nail zone 79 and the roof deck 30, the second layer 78 is moved so as to cover the nail zone 79, the headlap portion 77, and/or the fasteners 40. Thus, in some embodiments, the head of the fastener 40 is between the first layer 71 of the roofing module 70 and the second layer 78 of the roofing module 70. In some embodiments, another component, such as one or more of the photovoltaic modules 10, the roofing modules 20, and/or the roofing modules 70 are installed in another module row, such that the another component covers the headlap portion 77, the nail zone 79, the fasteners 40, and/or the second layer 78 of the roofing module 70.

As shown in the figures, in some embodiments, the second layer 78 is the same size as the headlap portion 77 (e.g., the second layer 78 does not extend beyond edges of the headlap portion 77). In some embodiments, the second layer 78 is the same length and/or width as the headlap portion 77. In some embodiments, as the figures show, the second layer 78 extends beyond edges of the headlap portion 77. In some embodiments, the second layer 78 is substantially the same size as the headlap portion 77.

FIG. 6 illustrates one module row on the roof deck 30. In some embodiments, the roofing system 600 includes one or more additional module rows above and/or below the illustrated module row. In some embodiments, the module row above the illustrated module row covers (e.g., at least partially overlaps) the headlap portions 77 of the roofing modules 70 in the first module row. In some embodiments, the module row above the illustrated module row covers (e.g., at least partially overlaps) the second layers 78 of the roofing modules 70 in the first module row (e.g., the second layer 78 of one of the roofing modules 70 is between the first layer 71 of the roofing module and the roofing module 70 in the upper module row).

In some embodiments, one or more of the roofing modules 70 includes a third layer. In some embodiments, the first layer 71 is between the second layer 78 and the third layer. In some embodiments, one or more of the roofing modules 70 includes a fourth layer. In some embodiments, the fourth layer is between the first layer and the third layer.

In some embodiments, any or all of the first layer 71, the second layer 78, the third layer, and/or the fourth layer includes a polymer, thermoplastic polyolefin (TPO), continuous fiber tape including TPO, ethylene tetrafluoroethylene (ETFE), and/or combinations thereof. In some embodiments, the first layer is composed of a polymer.

In some embodiments, any or all of the first layer 71, the second layer 78, the third layer, and/or the fourth layer is composed of metal. In some embodiments, any or all of the first layer 71, the third layer, and/or the fourth layer is composed of steel. In some embodiments, any or all of the first layer 71, the second layer 78, the third layer, and/or the fourth layer is composed of aluminum.

In some embodiments, the second layer 78 is a foil. In some embodiments, the second layer 78 is a metal foil. In some embodiments, the second layer 78 is a sheet. In some embodiments, the second layer 78 is a flexible sheet. In some embodiments, the term "flexible" means and refers to a material or structure that has the ability to deform under stress without breaking or permanently losing its shape, and can be elastic (recoverable), and with respect to the second layer 78, such has the ability to deform, bend, twist, compress, flex, or move without breaking, ripping, or tearing or permanently losing its size and shape.

In some embodiments, the roofing module 70 includes the second layer 78 as a top layer, the first layer 71 comprising TPO as the next layer, a continuous fiber tape layer adjacent the first layer 71, and another TPO layer adjacent the continuous fiber tape layer.

In some embodiments, the continuous fiber tape has a thickness of 150 µm. In some embodiments, the continuous fiber tape has a thickness of 175 µm. In some embodiments, the continuous fiber tape has a thickness of 200 µm. In some embodiments, the continuous fiber tape has a thickness of 250 µm. In some embodiments, the continuous fiber tape has a thickness of 300 µm. In some embodiments, the continuous fiber tape has a thickness of 350 µm. In some embodiments, the continuous fiber tape has a thickness of 400 µm. In some embodiments, the continuous fiber tape has a thickness of 450 µm. In some embodiments, the continuous fiber tape has a thickness of 500 µm. In some embodiments, the continuous fiber tape has a thickness of 550 µm. In some embodiments, the continuous fiber tape has a thickness of 600 µm.

In some embodiments, the continuous fiber tape has a thickness of more than 150 µm. In some embodiments, the continuous fiber tape has a thickness of more than 175 µm. In some embodiments, the continuous fiber tape has a thickness of more than 200 µm. In some embodiments, the continuous fiber tape has a thickness of more than 250 µm. In some embodiments, the continuous fiber tape has a thickness of more than 300 µm. In some embodiments, the continuous fiber tape has a thickness of more than 350 µm. In some embodiments, the continuous fiber tape has a thickness of more than 400 µm. In some embodiments, the continuous fiber tape has a thickness of more than 450 µm. In some embodiments, the continuous fiber tape has a thickness of more than 500 µm. In some embodiments, the continuous fiber tape has a thickness of more than 550 µm. In some embodiments, the continuous fiber tape has a thickness of more than 600 µm.

In some embodiments, the continuous fiber tape has a thickness of less than 150 µm. In some embodiments, the continuous fiber tape has a thickness of less than 175 µm. In some embodiments, the continuous fiber tape has a thickness of less than 200 µm. In some embodiments, the continuous fiber tape has a thickness of less than 250 µm. In some embodiments, the continuous fiber tape has a thickness of less than 300 µm. In some embodiments, the continuous fiber tape has a thickness of less than 350 µm. In some embodiments, the continuous fiber tape has a thickness of less than 400 µm. In some embodiments, the continuous fiber tape has a thickness of less than 450 µm. In some embodiments, the continuous fiber tape has a thickness of less than 500 µm. In some embodiments, the continuous fiber tape has a thickness of less than 550 µm. In some embodiments, the continuous fiber tape has a thickness of less than 600 µm.

In some embodiments, the continuous fiber tape has a thickness of 150 µm to 600 µm. In some embodiments, the continuous fiber tape has a thickness of 175 µm to 600 µm. In some embodiments, the continuous fiber tape has a thickness of 200 µm to 600 µm. In some embodiments, the continuous fiber tape has a thickness of 250 µm to 600 µm. In some embodiments, the continuous fiber tape has a thickness of 300 µm to 600 µm. In some embodiments, the continuous fiber tape has a thickness of 350 µm to 600 µm. In some embodiments, the continuous fiber tape has a thickness of 400 µm to 600 µm. In some embodiments, the continuous fiber tape has a thickness of 450 µm to 600 µm. In some embodiments, the continuous fiber tape has a thickness of 500 µm to 600 µm. In some embodiments, the continuous fiber tape has a thickness of 550 µm to 600 µm.

In some embodiments, the continuous fiber tape has a thickness of 150 μm to 550 μm. In some embodiments, the continuous fiber tape has a thickness of 175 μm to 550 μm. In some embodiments, the continuous fiber tape has a thickness of 200 μm to 550 μm. In some embodiments, the continuous fiber tape has a thickness of 250 μm to 550 μm. In some embodiments, the continuous fiber tape has a thickness of 300 μm to 550 μm. In some embodiments, the continuous fiber tape has a thickness of 350 μm to 550 μm. In some embodiments, the continuous fiber tape has a thickness of 400 μm to 550 μm. In some embodiments, the continuous fiber tape has a thickness of 450 μm to 550 μm. In some embodiments, the continuous fiber tape has a thickness of 500 μm to 550 μm.

In some embodiments, the continuous fiber tape has a thickness of 150 μm to 500 μm. In some embodiments, the continuous fiber tape has a thickness of 175 μm to 500 μm. In some embodiments, the continuous fiber tape has a thickness of 200 μm to 500 μm. In some embodiments, the continuous fiber tape has a thickness of 250 μm to 500 μm. In some embodiments, the continuous fiber tape has a thickness of 300 μm to 500 μm. In some embodiments, the continuous fiber tape has a thickness of 350 μm to 500 μm. In some embodiments, the continuous fiber tape has a thickness of 400 μm to 500 μm. In some embodiments, the continuous fiber tape has a thickness of 450 μm to 500 μm.

In some embodiments, the continuous fiber tape has a thickness of 150 μm to 450 μm. In some embodiments, the continuous fiber tape has a thickness of 175 μm to 450 μm. In some embodiments, the continuous fiber tape has a thickness of 200 μm to 450 μm. In some embodiments, the continuous fiber tape has a thickness of 250 μm to 450 μm. In some embodiments, the continuous fiber tape has a thickness of 300 μm to 450 μm. In some embodiments, the continuous fiber tape has a thickness of 350 μm to 450 μm. In some embodiments, the continuous fiber tape has a thickness of 400 μm to 450 μm.

In some embodiments, the continuous fiber tape has a thickness of 150 μm to 400 μm. In some embodiments, the continuous fiber tape has a thickness of 175 μm to 400 μm. In some embodiments, the continuous fiber tape has a thickness of 200 μm to 400 μm. In some embodiments, the continuous fiber tape has a thickness of 250 μm to 400 μm. In some embodiments, the continuous fiber tape has a thickness of 300 μm to 400 μm. In some embodiments, the continuous fiber tape has a thickness of 350 μm to 400 μm.

In some embodiments, the continuous fiber tape has a thickness of 150 μm to 350 μm. In some embodiments, the continuous fiber tape has a thickness of 175 μm to 350 μm. In some embodiments, the continuous fiber tape has a thickness of 200 μm to 350 μm. In some embodiments, the continuous fiber tape has a thickness of 250 μm to 350 μm. In some embodiments, the continuous fiber tape has a thickness of 300 μm to 350 μm.

In some embodiments, the continuous fiber tape has a thickness of 150 μm to 300 μm. In some embodiments, the continuous fiber tape has a thickness of 175 μm to 300 μm. In some embodiments, the continuous fiber tape has a thickness of 200 μm to 300 μm. In some embodiments, the continuous fiber tape has a thickness of 250 μm to 300 μm.

In some embodiments, the continuous fiber tape has a thickness of 150 μm to 250 μm. In some embodiments, the continuous fiber tape has a thickness of 175 μm to 250 μm. In some embodiments, the continuous fiber tape has a thickness of 200 μm to 250 μm.

In some embodiments, the continuous fiber tape has a thickness of 150 μm to 200 μm. In some embodiments, the continuous fiber tape has a thickness of 175 μm to 200 μm. In some embodiments, the continuous fiber tape has a thickness of 150 μm to 175 μm.

In some embodiments, one or more of the TPO layers has a thickness of 25 mils. In some embodiments, the TPO has a thickness of 50 mils. In some embodiments, the TPO has a thickness of 75 mils. In some embodiments, the TPO has a thickness of 100 mils. In some embodiments, the TPO has a thickness of 125 mils. In some embodiments, the TPO has a thickness of 150 mils.

In some embodiments, the TPO has a thickness of more than 25 mils. In some embodiments, the TPO has a thickness of more than 50 mils. In some embodiments, the TPO has a thickness of more than 75 mils. In some embodiments, the TPO has a thickness of more than 100 mils. In some embodiments, the TPO has a thickness of more than 125 mils. In some embodiments, the TPO has a thickness of more than 150 mils.

In some embodiments, the TPO has a thickness of less than 25 mils. In some embodiments, the TPO has a thickness of less than 50 mils. In some embodiments, the TPO has a thickness of less than 75 mils. In some embodiments, the TPO has a thickness of less than 100 mils. In some embodiments, the TPO has a thickness of less than 125 mils. In some embodiments, the TPO has a thickness of less than 150 mils.

In some embodiments, the TPO has a thickness of 25 mils to 150 mils. In some embodiments, the TPO has a thickness of 50 mils to 150 mils. In some embodiments, the TPO has a thickness of 75 mils to 150 mils. In some embodiments, the TPO has a thickness of 100 mils to 150 mils. In some embodiments, the TPO has a thickness of 125 mils to 150 mils.

In some embodiments, the TPO has a thickness of 25 mils to 125 mils. In some embodiments, the TPO has a thickness of 50 mils to 125 mils. In some embodiments, the TPO has a thickness of 75 mils to 125 mils. In some embodiments, the TPO has a thickness of 100 mils to 125 mils.

In some embodiments, the TPO has a thickness of 25 mils to 100 mils. In some embodiments, the TPO has a thickness of 50 mils to 100 mils. In some embodiments, the TPO has a thickness of 75 mils to 100 mils.

In some embodiments, the TPO has a thickness of 25 mils to 75 mils. In some embodiments, the TPO has a thickness of 50 mils to 75 mils. In some embodiments, the TPO has a thickness of 25 mils to 50 mils.

In some embodiments, the roofing system 600 includes one or more of the photovoltaic modules 10, with or without the sealant 50, as shown and described. In some embodiments, one or more of the photovoltaic modules 10 includes the second layer 78. Thus, in some embodiments, the second layer 78 is movable so as to cover or overlap the headlap portion 17 and the nail zone 19 of, as well as the fasteners 40 penetrating, the photovoltaic module 10; and is movable so as to uncover the headlap portion 17, the nail zone 19, and the fasteners 40. In some embodiments, the roofing modules 70 include the sealant 50, as shown and described.

In some embodiments, one or more of the above described components, such as but not limited to the second layer 78, impedes water that flows between rows of roofing modules 70 from flowing down through the holes made by the fasteners 40 into the roof deck 30.

Figure 10:
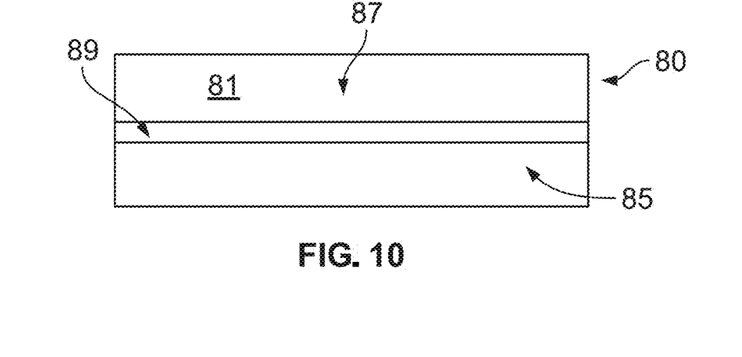
FIGS. 10 and 11 illustrate schematic views of a top surface and a bottom surface of a roofing module, in accordance with some embodiments.
Figure 11:
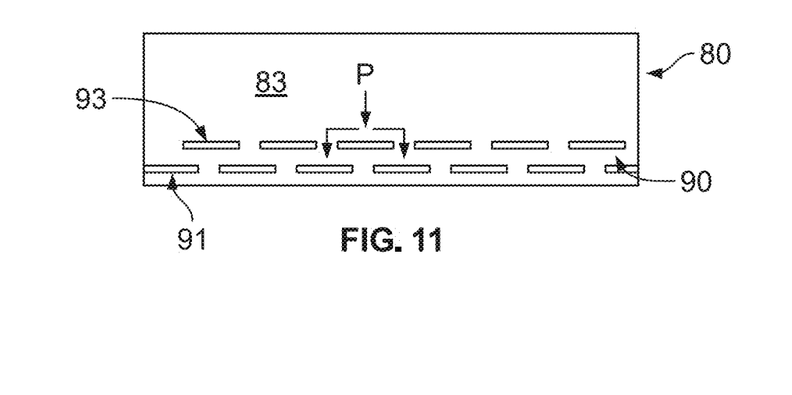
Figure 12:
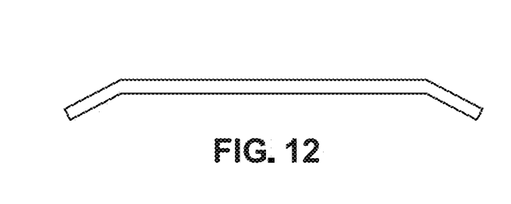
FIGS. 12 through 14 illustrate examples of shapes for adhesive line segments on the roofing module of FIGS. 10 and 11, in accordance with some embodiments.
Figure 13:
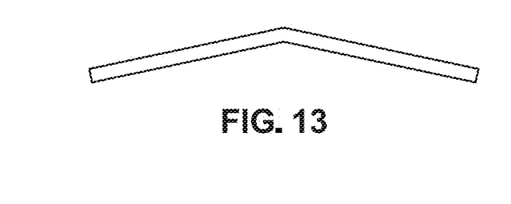
Figure 14:
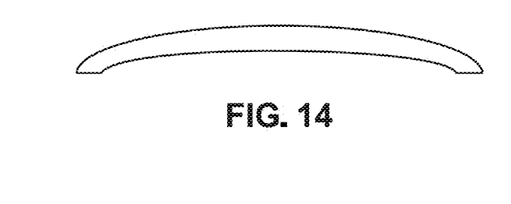

FIGS. 10 and 11 show schematic views of a top surface and a bottom surface of a roofing module, and FIGS. 12, 13, and 14 show examples of shapes for an adhesive on the roofing module of FIGS. 10 and 11, in accordance with some embodiments. As FIGS. 10 and 11 show, in some embodiments, a roofing module 80 includes a top surface 81, and a bottom surface 83 opposite the top surface 81. In some embodiments, when one or more of the roofing modules 80 are installed on a roof deck, such as the roof deck 30 as shown and described, the bottom surface 83 is closest to the roof deck than any other surface of the roofing module 80, and the top surface 81 is an uppermost surface of the roofing module 80. In some embodiments, the top surface 81 includes a reveal portion 85 and a headlap portion 87. In some embodiments, the headlap portion 87 includes a nail zone 89. In some embodiments, the roofing module 80 is any of the photovoltaic module 10, the roofing module 20, and/or the roofing module 70. In some embodiments, the roofing module in installed in any of the roofing systems 100, 200, 300, 400, 500, or 600, with any or all of one or more of the photovoltaic modules 10, one or more of the roofing modules 20, and/or one or more of the roofing modules 70.

As shown in the figures, in some embodiments, the bottom surface 83 of the roofing module 80 includes multiple adhesive lines 90. In some embodiments, the roofing module 80 includes two adhesive lines 90. In some embodiments, the roofing module 80 includes three adhesive lines 90. In some embodiments, the roofing module 80 includes more than three adhesive lines 90.

As shown in the figures, in some embodiments, one or more of the adhesive lines 90 is a discontinuous line of adhesive that includes a plurality of adhesive line segments. In some embodiments, one or more of the adhesive lines 90 includes two adhesive line segments. In some embodiments, one or more of the adhesive lines 90 includes three adhesive line segments. In some embodiments, one or more of the adhesive lines 90 includes four adhesive line segments. In some embodiments, one or more of the adhesive lines 90 includes five adhesive line segments. In some embodiments, one or more of the adhesive lines 90 includes six adhesive line segments. In some embodiments, one or more of the adhesive lines 90 includes seven adhesive line segments. In some embodiments, one or more of the adhesive lines 90 includes eight adhesive line segments. In some embodiments, one or more of the adhesive lines 90 includes nine adhesive line segments. In some embodiments, one or more of the adhesive lines 90 includes ten adhesive line segments. In some embodiments, one or more of the adhesive lines 90 includes more than ten adhesive line segments.

In some embodiments, the adhesive lines 90 include a first adhesive line 91 that is a discontinuous line of adhesive having a plurality of adhesive line segments (e.g., at least a first line segment and a second line segment). In some embodiments, the adhesive lines 90 include a second adhesive line 93 that is a discontinuous line of adhesive having a plurality of adhesive line segments (e.g., at least a first line segment and a second line segment). In some embodiments, a spacing between the adhesive line segments of the first adhesive line 91 (e.g., a spacing between the first and second adhesive line segments) differs from a spacing between the adhesive line segments of the second adhesive line 93 (e.g., a spacing between the third and fourth adhesive line segments). In some embodiments, the spacing between the adhesive line segments of the first adhesive line 91 (e.g., the spacing between the first and second adhesive line segments) is the same as the spacing between the adhesive line segments of the second adhesive line 93 (e.g., the spacing between the third and fourth adhesive line segments).

In some embodiments, when two of the roofing modules 80 are installed on the roof deck 30, such that a first one of the roofing modules 80 is in a first module row, and a second one of the roofing modules 80 is in a second module row above the first module row, for example, the adhesive line segments of the first adhesive line 91 (e.g., the first and second adhesive line segments) and the adhesive line segments of the second adhesive line 93 (e.g., the third and fourth adhesive line segments) on the second roofing module 80 seal with the headlap portion 87 of the first roofing module 80. In some embodiments, because the adhesive line segments of the different adhesive lines 90 are offset from one another, the adhesive lines 90 and the adhesive line segments define a tortuous path between the first roofing module 80 that overlaps the second roofing module 80. In some embodiments, the tortuous path impedes the flow of water, between the roofing modules 80. In some embodiments, the term "tortuous path" means a path that is offset, winding, bending, twisted, or convoluted to impede water flow, and, for example, for creating resistance that prevents or minimizes the volume of water flow or the speed of the water flow.

In some embodiments, the adhesive line segments of the first adhesive line 91, and/or the adhesive line segments of the second adhesive line 93, have a specific shape. As FIG. 11 shows, in some embodiments, the adhesive line segments are straight line segments. In some embodiments, the adhesive line segments of the first adhesive line 91 and/or the second adhesive line 93 creates a tortuous path P for impeding water flow that happens to enter under the lower surface of the roofing module 80.

FIGS. 12, 13, and 14 show examples of other shapes of the adhesive line segments, according to some embodiments. In some embodiments, the shapes of the adhesive line segments include angle shapes, arcuate shapes, polygonal shapes, non-polygonal shapes, oval shapes, elliptical shapes, triangular shapes, elongated segments, rectangular shapes, circular shapes, square shapes, or one or more combinations thereof. In some embodiments, the shapes of the adhesive line segments may be other shapes than those the figures illustrate. In some embodiments, the adhesive line segments of the first adhesive line 91 and the second adhesive line 93 define a tortuous path between the first roofing module 80 and the second roofing module 80.

Figure 15:
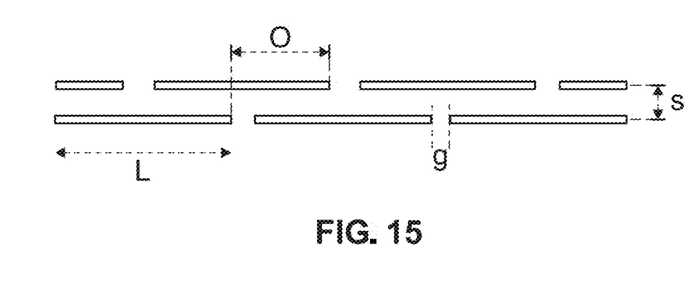
FIG. 15 illustrates an exemplary arrangement of adhesive line segments in accordance with some embodiments.

FIG. 15 shows an exemplary arrangement of the adhesive line segments in accordance with some embodiments. The arrangement has the following values for "L" (a length of the line segment), "O" (an offset or distance between ends of line segments in different adhesive lines), "g" (a gap or distance between adhesive line segments in a same adhesive line), and "s" (a spacing or distance between centers of the different adhesive lines):

L=295 mm+5 mm;
O=160 mm+5 mm;
g=25 mm+5 mm; and/or
s=25 mm+5 mm.

Variations, modifications, and alterations to embodiments of the present disclosure described above will make themselves apparent to those skilled in the art. All such variations, modifications, alterations and the like are intended to fall within the spirit and scope of the present disclosure, limited solely by the appended claims.

While several embodiments of the present disclosure have been described, it is understood that these embodiments are illustrative only, and not restrictive, and that many modifications may become apparent to those of ordinary skill in the art. For example, all dimensions discussed herein are provided as examples only, and are intended to be illustrative and not restrictive.

Any feature or element that is positively identified in this description may also be specifically excluded as a feature or element of an embodiment of the present as defined in the claims.

The disclosure described herein may be practiced in the absence of any element or elements, limitation or limitations, which is not specifically disclosed herein. The terms and expressions which have been employed are used as terms of description and not of limitation, and there is no intention in the use of such terms and expressions of excluding any equivalents of the features shown and described or portions thereof, but it is recognized that various modifications are possible within the scope of the disclosure.

What is claimed is:

1. A roofing system, comprising:
   a roof deck;
   at least one photovoltaic module,
      wherein the at least one photovoltaic module includes a first photovoltaic module installed on the roof deck in a first row,
      wherein the first photovoltaic module includes at least one solar cell,
      wherein the first photovoltaic module includes a sealant,
      wherein the first photovoltaic module includes an encapsulant,
         wherein the encapsulant encapsulates the at least one solar cell, and
      wherein the first photovoltaic module includes a backsheet,
         wherein the backsheet is juxtaposed with the encapsulant, and wherein the sealant is juxtaposed with a surface of the backsheet; and
   at least one fastener, wherein the at least one fastener includes a first fastener that penetrates at least the sealant and the roof deck.

2. The roofing system of claim 1, wherein the first photovoltaic module includes two layers, and wherein the sealant is between the two layers.

3. The roofing system of claim 1, wherein the sealant includes a butyl adhesive.

4. The roofing system of claim 1, wherein the first fastener includes at least one of a nail, screw, rivet, clip, or staple.

5. The roofing system of claim 1, wherein the at least one fastener includes a second fastener, wherein the second fastener penetrates the first photovoltaic module and the roof deck without penetrating the sealant.

6. The roofing system of claim 1, further comprising at least one roofing module, wherein the at least one roofing module includes a first roofing module installed on the roof deck in the first row, and a flashing installed under an end of the first photovoltaic module and an end of the first roofing module, and wherein the first fastener penetrates the flashing.

7. The roofing system of claim 6, wherein an end of the sealant extends past an end of the flashing.

8. A roofing system, comprising:
   a roof deck;
   at least one photovoltaic module,
      wherein the at least one photovoltaic module includes a first photovoltaic module installed on the roof deck in a first row,
      wherein the first photovoltaic module includes at least one solar cell;
   at least one roofing module, wherein the at least one roofing module includes a first roofing module installed on the roof deck in the first row,
      wherein the first roofing module includes:
         a first layer,
            wherein the first layer has a length and a width,
            wherein the width is less than the length; and
         a sealant,
            wherein the sealant is juxtaposed with the first layer,
            wherein the sealant has a length that is less than the length of the first layer,
            wherein an end of the first roofing module abuts an end of the first photovoltaic module; and
   at least one fastener,
      wherein the at least one fastener includes a first fastener that penetrates at least the sealant, the end of the first roofing module, and the roof deck.

9. The roofing system of claim 8, wherein the first roofing module includes a second layer, and wherein the sealant is between the first layer and the second layer.

10. The roofing system of claim 8, further comprising a flashing installed under the end of the first roofing module and the end of the first photovoltaic module, and wherein the first fastener penetrates the flashing.

11. The roofing system of claim 10, wherein an end of the sealant extends past an end of the flashing.

12. A roofing system, comprising:
    a roof deck;
    at least one roofing module, wherein the at least one roofing module includes
       a first roofing module installed on the roof deck,
          wherein the at least one roofing module includes:
             a first layer,
                wherein the first layer includes a reveal portion and a headlap portion, wherein the headlap portion includes a nail zone, and
             a second layer attached to the first layer,
                wherein the second layer overlays the headlap portion of the first layer, and
             a third layer,
                wherein the first layer is between the second layer and the third layer,
                wherein the third layer comprises one of thermoplastic polyolefin or continuous fiber thermoplastic; and
       at least one fastener,
          wherein the at least one fastener includes a first fastener, the first fastener comprising a head and a shaft extending from the head, wherein the shaft penetrates the nail zone of the first roofing module and the roof deck, and wherein the head is between the first layer of the first roofing module and the second layer of the first roofing module.

13. The roofing system of claim 12, wherein the second layer comprises a polymer.

14. The roofing system of claim 13, wherein the second layer comprises ethylene tetrafluoroethylene (ETFE).

15. The roofing system of claim 12, wherein an end of the second layer extends beyond an end of the headlap portion of the first layer.

16. The roofing system of claim 12, wherein the first roofing module is installed on the roof deck in first row, wherein the at least one roofing module includes a second roofing module installed on the roof deck in a second row above the first row, wherein second roofing module at least partially overlaps the first roofing module, and wherein the second layer of the first roofing module is between the first layer of the first roofing module and the second roofing module.

17. The roofing system of claim 12, wherein the first layer is composed of a polymer.

18. The roofing system of claim 16, wherein each of the first roofing module and the second roofing module includes a first adhesive line, wherein the first adhesive line is juxtaposed with the first layer thereof, and a second adhesive line, wherein the second adhesive line is juxtaposed with the first layer thereof, and wherein the first adhesive line and the second adhesive line of the second roofing module contact the first roofing module.

\* \* \* \* \*